United States Patent [19]
Krueger

[11] 3,727,541
[45] Apr. 17, 1973

[54] HOT WATER SUPPLY SYSTEM FOR BREWER

[75] Inventor: Harvey R. Krueger, Carpentersville, Ill.

[73] Assignee: Reynolds Products, Inc., Schaumburg, Ill.

[22] Filed: June 7, 1971

[21] Appl. No.: 150,282

[52] U.S. Cl. ................................................99/307
[51] Int. Cl. ...............................................A47j 31/00
[58] Field of Search........................99/281, 282, 283, 99/295, 289, 300, 302, 304, 305, 307

[56] References Cited

UNITED STATES PATENTS

| | | | |
|---|---|---|---|
| 3,443,508 | 5/1969 | Reynolds | 99/282 |
| 3,354,810 | 11/1967 | Lorang | 99/282 |
| 3,385,201 | 5/1968 | Martin | 99/295 |

*Primary Examiner*—Robert W. Jenkins
*Attorney*—Shenier and O'Connor

[57] ABSTRACT

A system for supplying hot water to the brewing chamber of a coffee brewer or the like in which a charge of cold water approximating the amount of beverage to be brewed is introduced into a hot water tank adapted normally to contain hot water to a predetermined level through the top of a vertically extending pipe in the tank having a diametral enlargement in the region of said level to discharge the cold water adjacent to a heater in the lower portion of the tank thus to displace a corresponding amount of hot water upwardly above said level to cause hot water to flow outwardly to the brewing chamber by means of a fitting in the wall of the tank through a downwardly opening inlet adjacent the level and through a screen in the fitting above the level.

6 Claims, 4 Drawing Figures

Patented April 17, 1973
3,727,541
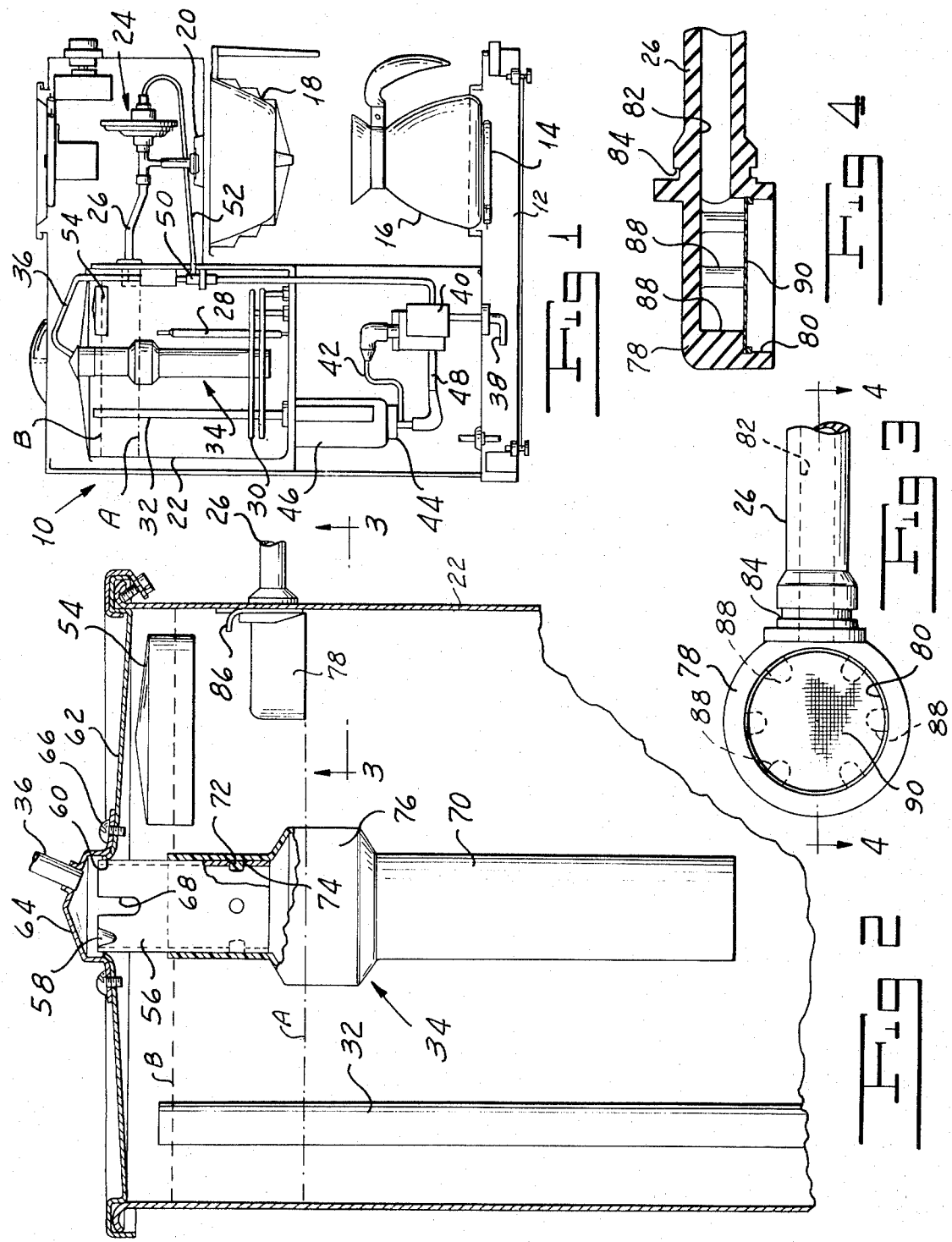
INVENTOR.
Harvey R. Krueger
BY
Shenier & O'Connor
ATTORNEYS

HOT WATER SUPPLY SYSTEM FOR BREWER

BACKGROUND OF THE INVENTION

Various arrangements are known in the prior art for brewing a beverage such as coffee a carafe at a time. One particular arrangement for brewing coffee in this manner is disclosed in U.S. Pat. No. 3,443,508 for Automatic Beverage Brewer. In the system disclosed in the patent a hot water tank, having a heater located adjacent the bottom of the tank, normally contains a supply of hot water at a predetermined level at which there is positioned a hot water discharge fitting in the wall of the container. The capacity of the tank is such that it can accommodate above the normal level of hot water an amount of water at least equal to the amount of beverage to be brewed.

In operation of the brewer disclosed in the patent, cold water is supplied by an inlet valve to the upper end of a large diameter stainless steel tube located in the tank. A hydraulic valve in the hot water outlet system is actuated in response to the cold water supply system to prevent outflow of hot water while cold water is being supplied to the tank. The cold water flows outwardly through the bottom of the stainless steel tube to displace hot water upwardly above the normal level until a liquid level switch indicates that a charge of hot water equal to the amount of beverage to be brewed has been displaced above the normal level. When that occurs the cold water supply valve closes and the displaced hot water flows outwardly through the outlet fitting to the brewing chamber of the system.

While the system described above functions satisfactorily to brew a carafe of coffee on each operation thereof, some difficulty has arisen in keeping the parts of the system sufficiently free from scale to provide effective operation without frequent cleaning. First, lime tends to build up in the cold water inlet tube in the region of the normal level of hot water in the tank. The same problem exists at the hot water outlet fitting. These problems are particularly severe in extremely hard water areas. In addition to the excessive build-up of lime in the inlet pipe and at the outlet fitting, the water in many areas contains floating scale which clogs the discharge spray head which receives hot water from the outlet fitting and supplies it to the brewing chamber.

I have invented an improved hot water supply system for a coffee brewer or the like which overcomes the defects pointed out hereinabove of coffee brewers of the prior art. My system prevents lime build-up from interfering with proper operation of the brewer even after a relatively long period of time in use. My system prevents floating scale from clogging the brewer spray head or any other parts of the brewer. My brewer requires appreciably less maintenance than do brewers of the prior art, even in extremely hard water areas.

SUMMARY OF THE INVENTION

One object of my invention is to provide an improved hot water supply system for a coffee brewer or the like which overcomes defects present in brewers of the prior art.

Another object of my invention is to provide an improved hot water supply system for a brewer which requires less maintenance than do systems of the prior art even in extremely hard water areas.

A further object of my invention is to provide an improved hot water system for a coffee brewer or the like which prevents lime build-up from interfering with proper operation of the brewer.

Yet another object of my invention is to provide an improved hot water supply system for a coffee brewer or the like which prevents floating scale from clogging any of the parts of the brewing system.

Other and further objects of my invention will appear from the following description.

In general my invention contemplates the provision of an improved hot water supply system for a coffee brewer or the like in which I form the cold water inlet pipe in two parts, the lower one of which is formed from scale resistant material and with a diametrally enlarged portion in the region of the normal hot water level of the tank and in which the hot water discharge fitting in the side wall of the tank has an enlarged downwardly opening inlet at the normal level with a screen located above the inlet so that floating scale which may collect on the screen during outflow of a charge of hot water is removed therefrom by a back-flushing action at the end of the discharge of a charge of hot water from the tank.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view of a coffee brewer system incorporating my improved hot water supply system.

FIG. 2 is a fragmentary sectional view of the hot water tank of my improved hot water supply system.

FIG. 3 is a bottom plan view of the outlet fitting of my improved hot water supply system taken along the line 3—3 of FIG. 2.

FIG. 4 is a sectional view of the hot water outlet fitting of my improved hot water supply system taken along the line 4—4 of FIG. 3.

DESCRIPTION OF THE PREFERRED EMBODIMENT

Referring now to the drawings, a brewer, indicated generally by the reference character 10, incorporating my improved hot water supply system includes a base 12, having a heating coil 14 adapted to support a carafe 16 containing a brewed beverage such as coffee or the like. The carafe 16 receives brewed beverage from a brewing chamber 18 containing ground coffee or the like to which hot water is supplied by a spray head 20. Hot water is fed to the spray head 20 from a hot water tank 22 through a hydraulically operated valve 24 located in an outlet line 26. Tank 22 houses a thermostatic control element 28 which controls a heater 30 located in the tank adjacent to the bottom thereof. An overflow pipe 32 prevents filling the tank 22 to above a predetermined level.

Cold water to be heated is introduced into the tank 22 adjacent to the bottom thereof in the region of heater 30 through an inlet pipe indicated generally by the reference character 34. Water from a fresh water inlet 38 connected to a suitable source (not shown) of fresh water is adapted to pass through a line 42 to a magnetic float valve 44 which closes when the level of water in a reservoir 46 is above a predetermined level. With valve 44 open, water from line 42 passes to a line 48 leading to a line 36 connected to the upper end of the inlet pipe 34. It will be seen that water from overflow pipe 32 passes to the reservoir 46 to close valve 44 when the tank has been filled to above the predetermined level thus to shut off the supply of cold water. Further as is more fully pointed out in the patent cited hereinabove a tee fitting 50, which connects lines 48 and 36 supplies a line 52 leading to the hydraulic valve 24. As long as cold water is being fed to the tank valve 24 closes to prevent the flow of hot water from line 26 to the spray head 20.

Further as is pointed out more fully in the patent referred to hereinabove, tank 22 normally contains hot water to a level indicated by the broken line A in FIG. 1. When a brewing operation is to take place and cold water is being fed to the tank 22, the outflow of hot water is cut off and the cold water displaces hot water upwardly to a level B to operate a liquid level switch 54 to cut off the supply of cold water and to permit the upwardly displaced hot water to flow out of the tank to the spray head 20.

In my improved hot water system I form the cold water inlet pipe 34 with an upper tubular section 56 made of a suitable material such as stainless steel. Struck out portions 58 at the upper edge are adapted to engage the edge of an opening 60 in the cover 62 of the tank to support the pipe assembly 34. Any suitable means such as screws 66 secure a cap 64 supporting the line 36 over the opening 60 to permit cold water from line 36 to flow into tube section 56. Slots 68 in the upper end of the pipe section 56 provide communication between the inside of the tank and the atmosphere.

The inner diameter of the pipe assembly 34 with relation to the dimensions of the tank 22 should be such as to permit the rapid introduction into the pipe of an amount of cold water sufficient to displace a quantity of hot water substantially equal to the amount of beverage to be brewed upwardly into the space between levels A and B.

The pipe assembly 34 of my improved hot water supply system includes a lower section 70, the upper end of which is formed with inwardly extending pins 72 adapted to engage in holes 74 in the wall of the section 56 to connect the two sections. I form the lower section 70 from a scale resistant material such for example as synthetic rubber or the like. I provide the section 70 with a diametrally enlarged portion 76 located in the region of the normal hot water level A of the hot water tank. Owing to that fact, scale which builds up on the inside of the section 70 in the enlarged region 76 will not restrict flow of cold water downwardly through the pipe assembly 34.

My improved hot water supply system includes a head 78 which may be integrally formed with line 26 from a suitable scale resistant material such as synthetic rubber or the like. I form head 78 with a downwardly opening inlet 80 of a relatively large diameter as compared with the diameter of the passage 82 formed by tube 26. An external annular recess 84 located between tube 26 and head 78 receives a portion of the wall of tank 22 around an opening through which the tube extends. Any suitable means such, for example, as a clip 86, may be employed to hold the head 78 in position within tank 22 with the opening 80 at the normal hot water level A. I form head 78 above the inlet 80 with a plurality of radially inwardly extending bosses adapted to position a screen 90 of fine mesh stainless steel in the head above the opening 80. Owing to the fact that the inlet opening 80, which is positioned at the level A at which scale tends to form, has a large diameter compared to the diameter of passage 82, a build-up of scale will not appreciably restrict the outward flow of hot water. Moreover, any floating scale in the hot water stream will be caught by screen 90.

In operation of a brewer provided with my improved hot water supply system, owing to the fact that both the pipe section 70 and the head 78 are formed from a scale resistant material, scale will not build up thereon as quickly as it would on a metal surface. Moreover, the diameter of the enlarged portion 76 of section 70 as compared to that of the rest of the inlet pipe 34 and the diameter of opening 80 relative to that of passage 82 are such that scale tending to build up on the inner surfaces of enlargement 76 and of opening 80 at the normal level A will not unduly restrict either the flow of cold water into the tank or the flow of hot water out of the tank. After a charge of cold water has been supplied to the tank to displace a charge of hot water upwardly to level B the hot water begins to flow outwardly and any floating scale is trapped on the inside of the screen 90. After the charge of hot water has flowed outwardly to the brewing chamber 18 and as the syphon effect is broken, a back-flow of hot water through passage 82 occurs and any scale which had built up on screen 90 is flushed back into the tank 22.

It will be seen that I have accomplished the objects of my invention. I have provided an improved hot water supply system for a coffee brewer or the like which overcomes the defects of supply systems of the prior art. My system prevents build-up of scale on the cold water inlet and at the hot water outlet from interfering with the proper operation of the machine. Moreover, my system prevents floating scale from clogging any of the parts of the machine.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An improved hot water supply system for a brewer having a brewing chamber including in combination, a tank, a heater located adjacent to the bottom of said tank, said tank adapted normally to contain a supply of hot water to a predetermined level, said tank having a capacity above said level equal to the amount of beverage to be brewed in one operation of said brewer, a pipe extending from the top toward the bottom of said tank for supplying cold water to said tank adjacent to the bottom thereof to displace hot water in said tank to above said level, said pipe having a portion of enlarged diameter in the region of said level, means providing a passage through the wall of said tank leading to said brewer, means providing a downwardly opening inlet at said level leading to said passage, and a screen in said inlet providing means above said inlet.

2. A system as in claim 1 in which said inlet has a diameter which is appreciably larger than said passage.

3. A system as in claim 1 in which said inlet providing means is formed of scale resistant material.

4. A system as in claim 1 in which said pipe comprises a lower section including said portion formed of scale resistant material.

5. A system as in claim 1 in which said inlet has a diameter which is appreciably larger than that of said passage, said inlet forming means being formed of scale resistant material, said pipe being formed with a lower section of scale resistant material, said lower section comprising said portion of increased diameter in the region of said level.

6. In an improved hot water supply system for a brewer having a brewing chamber, an assembly comprising a tank, a heater located adjacent to the bottom of said tank, said tank adapted normally to contain a supply of hot water to a predetermined level, a cold water supply pipe extending from the top of said tank to a location adjacent to said heater, means for feeding cold water into the top of said pipe to cause said cold water to displace hot water upwardly in said tank above said level, said tank having a hot water capacity above said level and outside said pipe at least equal to the amount of beverage to be brewed, said pipe having a normal diameter such as to permit the rapid introduction thereinto of a quantity of cold water equal to said amount and an enlarged diametral portion of said pipe at said level.

* * * * *